(12) United States Patent
Xu et al.

(10) Patent No.: US 12,267,844 B2
(45) Date of Patent: Apr. 1, 2025

(54) COMMUNICATION METHOD AND APPARATUS

(71) Applicant: HUAWEI TECHNOLOGIES CO., LTD., Guangdong (CN)

(72) Inventors: Bin Xu, Beijing (CN); Hong Wang, Beijing (CN); Lei Chen, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 439 days.

(21) Appl. No.: 17/668,795

(22) Filed: Feb. 10, 2022

(65) Prior Publication Data
US 2022/0167328 A1 May 26, 2022

Related U.S. Application Data

(63) Continuation of application No. PCT/CN2020/092693, filed on May 27, 2020.

(30) Foreign Application Priority Data

Aug. 31, 2019 (CN) .......................... 201910819789.6

(51) Int. Cl.
*H04W 72/23* (2023.01)
*H04L 5/00* (2006.01)
*H04W 48/08* (2009.01)

(52) U.S. Cl.
CPC ........... *H04W 72/23* (2023.01); *H04L 5/0092* (2013.01); *H04W 48/08* (2013.01)

(58) Field of Classification Search
CPC ..... H04W 72/23; H04W 48/08; H04W 48/12; H04W 48/16; H04L 5/0092; H04L 1/08; H04L 5/0053; H04L 1/1607
See application file for complete search history.

(56) References Cited

U.S. PATENT DOCUMENTS

2011/0320856 A1   12/2011   Deivasigamani et al.
2016/0234826 A1*  8/2016    Chen ....................... H04W 4/70
(Continued)

FOREIGN PATENT DOCUMENTS

CN    104348573 A    2/2015
CN    107040903 A    8/2017
(Continued)

OTHER PUBLICATIONS

3GPP TS 25.331 V4.0.0 (Mar. 2001), "3rd Generation Partnership Project; Technical Specification Group Radio Access Network; RRC Protocol Specification (Release 4)," Mar. 2001, 758 pages.
3GPP TS 36.331 V15.6.0 (Jun. 2019), "3rd Generation Partnership Project; Technical Specification Group Radio Access Network; Evolved Universal Terrestrial Radio Access (E-UTRA); Radio Resource Control (RRC); Protocol specification (Release 15)," Jun. 2019, 960 pages.

(Continued)

*Primary Examiner* — Jung H Park
(74) *Attorney, Agent, or Firm* — Fish & Richardson P.C.

(57) ABSTRACT

Embodiments of this application provide example communication methods and apparatuses. One example method includes receiving, by a terminal device, N pieces of first information in N separate transmissions, where N is an integer greater than 1. The terminal device can then determine second information or transmission information of the second information based on at least a part of the N pieces of first information, where each of the N pieces of first information includes M bits, and M is an integer greater than or equal to 1.

18 Claims, 5 Drawing Sheets

(56) References Cited

U.S. PATENT DOCUMENTS

| | | | |
|---|---|---|---|
| 2017/0134881 A1 | 5/2017 | Oh | |
| 2018/0109285 A1 | 4/2018 | Takeda et al. | |
| 2018/0132165 A1* | 5/2018 | Takahashi | H04W 48/10 |
| 2019/0124625 A1* | 4/2019 | Takeda | H04W 48/10 |
| 2021/0298025 A1* | 9/2021 | Wang | H04W 72/53 |
| 2022/0338181 A1* | 10/2022 | Tabet | H04W 48/12 |

FOREIGN PATENT DOCUMENTS

| | | |
|---|---|---|
| CN | 107211349 A | 9/2017 |
| CN | 109392138 A | 2/2019 |
| CN | 109462891 A | 3/2019 |
| CN | 109792672 A | 5/2019 |
| WO | 2016053039 A1 | 4/2016 |
| WO | 2017078091 A1 | 5/2017 |
| WO | 2019159107 A1 | 8/2019 |

OTHER PUBLICATIONS

Partial Supplementary European Search Report issued in European Application No. 20859266.7 on Aug. 8, 2022, 19 pages.

Office Action issued in Chinese Application No. 201910819789.6 on Aug. 31, 2021, 25 pages (with English translation).

Huawei, HiSilicon, "Discussion on UE behavior on mixed numerology carrier," 3GPP TSG RAN WG1 Meeting #86bis, R1-1609425, Lisbon, Portugal, Oct. 10-14, 2016, 4 pages.

Office Action issued in Chinese Application No. 201910819789.6 on Feb. 21, 2022, 11 pages.

Samsung, "SIB-1 Transmission for Low Cost UEs," 3GPP TSG RAN WG1 #82, R1-154106, Beijing, China, Aug. 24-28, 2015, 3 pages.

* cited by examiner

COMMUNICATION METHOD AND APPARATUS

CROSS-REFERENCE TO RELATED APPLICATIONS

This application is a continuation of International Application No. PCT/CN2020/092693, filed on May 27, 2020, which claims priority to Chinese Patent Application No. 201910819789.6, filed on Aug. 31, 2019. The disclosures of the aforementioned applications are hereby incorporated by reference in their entireties.

TECHNICAL FIELD

This application relates to the communication field, and in particular, to a communication method and apparatus.

BACKGROUND

After camping on a cell, a terminal device may learn of a working status in the cell by receiving system information. The system information includes a master information block (MIB) and a system information block (SIB), and the SIB includes an SIB1 and other system information (OSI). The terminal device may first receive the MIB, and then receive the SIB1 and the OSI.

In a scenario of narrowband (NB) communication, machine type communication (MTC), internet of things (IoT) communication, or lightweight new radio (NR) communication, a distribution environment of the terminal device is remote and complex, and a probability of correctly receiving information (for example, system information) is low. Therefore, how to ensure that the terminal device correctly receives information becomes an urgent problem to be resolved.

SUMMARY

Embodiments of this application provide a communication method and apparatus, to maximally ensure that a terminal device correctly receives information (for example, system information), and improve system communication performance.

According to a first aspect, an embodiment of this application provides a communication method, including: A terminal device receives first information, where a quantity of transmissions of the first information is N, and N is an integer greater than 1; and the terminal device determines second information or transmission information of the second information based on the first information, where the first information includes M bits, and M is an integer greater than or equal to 1.

Based on the method provided in this embodiment of this application, the terminal device may receive the first information transmitted for N times, and determine the second information or the transmission information (for example, a quantity of repeated transmissions of system information) of the second information based on the N pieces of first information. Then the terminal device may receive for a plurality of times the second information based on the transmission information (for example, the quantity of repeated transmissions of the system information) of the second information. This maximally ensures that the terminal device correctly receives the second information, to improve system communication performance.

In a possible implementation, that the terminal device determines second information or transmission information of the second information based on the first information includes: The terminal device determines the second information or the transmission information of the second information based on some or all bits in the received N pieces of first information. The some or all bits in the N pieces of first information may form a bitmap, and the bitmap may be used to indicate the second information or the transmission information of the second information.

In a possible implementation, the transmission information of the second information includes at least one of the following information: a quantity of repeated transmissions of the second information, a quantity of repeated transmissions of scheduling information of the second information, frequency domain resource information of the second information, or time domain resource information of the second information. The terminal device may determine, based on the quantity of repeated transmissions of the second information, duration for monitoring the second information, and monitor the second information within the duration. The terminal device may determine, based on the quantity of repeated transmissions of the scheduling information of the second information, duration for monitoring the quantity of repeated transmissions of the scheduling information of the second information, and monitor the scheduling information of the second information within the duration, to obtain time-frequency resource information of the second information.

In a possible implementation, the frequency domain resource information includes bandwidth part (BWP) information, where the BWP information is used to indicate a BWP in which the second information is located; and/or the time domain resource information is used to indicate at least one of the following information: a time domain position of the second information, whether the second information is continuously scheduled, periodically scheduled, or scheduled according to a preset rule in time domain, and scheduling duration or a scheduling periodicity of the second information in time domain.

In a possible implementation, that the terminal device determines the second information or the transmission information of the second information based on some or all bits in the received N pieces of first information includes: The terminal device determines a second bit in the received N pieces of first information based on a first bit in the received N pieces of first information, where the first bit is used to indicate location information of the second bit; and the terminal device determines the second information or the transmission information of the second information based on the second bit.

It should be noted that the N pieces of first information may form a bitmap. The terminal device may learn of a bit quantity of the second bit and/or a location of the second bit in the bitmap by reading the first bit in the bitmap, and then specifically read the second bit, to determine the second information or the transmission information of the second information based on the second bit without reading the entire bitmap.

In a possible implementation, the first information is carried in an MIB, and the second information is an SIB1. Alternatively, the first information is carried in an SIB1, and the second information is OSI.

In this way, the transmission information (for example, a quantity of repeated transmissions of the SIB1) of the second information may be indicated by combining the first information in the MIB (for example, a bit in the MIB) that is repeatedly transmitted for a plurality of times in time domain, and a format of the MIB does not need to be changed. Alternatively, the transmission information (for example, a quantity of repeated transmissions of the OSI) of the second information may be indicated by combining the first information in the SIB1 (for example, M bits in the SIB1) that is repeatedly transmitted for a plurality of times in time domain, and a format of the SIB1 does not need to be changed. It should be noted that this time domain extension method is not limited to the MIB and the SIB scenarios. In another scenario, other information (the transmission information of the second information) may alternatively be indicated by combining the first information that is sent for a plurality of times in time domain. A specific application scenario is not limited in this application.

According to a second aspect, an embodiment of this application provides a communication method, including: A terminal device receives first system information, where the first system information includes indication information; and the terminal device determines transmission information of second system information based on the indication information. There is a correspondence between a type of the terminal device and the transmission information of the second system information, where the transmission information of the second system information includes at least one of the following information: a quantity of repeated transmissions of the second system information, a quantity of repeated transmissions of scheduling information of the second system information, frequency domain resource information of the second system information, or time domain resource information of the second system information.

Based on the method provided in this embodiment of this application, the terminal device may determine the transmission information (for example, a quantity of repeated transmissions of an SIB1) of the second system information based on the indication information in the first system information (for example, an MIB). There is the correspondence between the type of the terminal device and the transmission information of the second system information. In this way, terminal devices of different types may more accurately receive the second system information (for example, the SIB1) based on the transmission information (for example, the quantity of repeated transmissions of the SIB1) of the second system information, to improve system communication performance.

In a possible implementation, the type of the terminal device includes one or more of the following types: user equipment, a wearable device, an active IoT device, or a passive IoT device used in an enhanced mobile broadband (eMBB) communication system, a narrowband (NB) communication system, an internet of things (IoT) communication system, a massive machine-type communication (mMTC) system, or a lightweight new radio (NR) communication system. A distribution environment of the foregoing type of terminal device is usually remote and complex, and has a high requirement on a coverage area of communication of a network device (for example, a base station). Based on the method provided in this embodiment of this application, the terminal device may determine, based on the indication information in the first system information and the correspondence between the type of the terminal device and the transmission information of the second system information, transmission information of second system information corresponding to the type of the terminal device, to more accurately receive the second system information (for example, the SIB1) based on the transmission information (for example, the quantity of repeated transmissions of the SIB1) of the second system information corresponding to the type of the terminal device. Consequently, the requirement of the terminal device on the coverage area of communication of the network device (for example, the base station) is met.

In a possible implementation, the frequency domain resource information includes BWP information, where the BWP information is used to indicate a BWP in which the second system information is located; and/or the time domain resource information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain.

In a possible implementation, the first system information is the MIB, and the second system information is the SIB1. Alternatively, the first system information is the SIB1, and the second system information is OSI.

According to a third aspect, an embodiment of this application provides a communication method, including: A terminal device receives first system information; the terminal device receives downlink control information (DCI) based on the first system information; and the terminal device determines transmission information of second system information based on the DCI. The transmission information of the second system information includes at least one of the following information: a quantity of repeated transmissions of the second system information, a quantity of repeated transmissions or continuous scheduling time of scheduling information of the second system information, frequency domain resource information of the second system information, or time domain resource information of the second system information.

Based on the method provided in this embodiment of this application, the terminal device may receive the DCI based on the first system information, and determine the transmission information (for example, a quantity of repeated transmissions of an SIB1) of the second system information based on the DCI. In this way, the terminal device may more accurately receive the second system information (for example, the SIB1) based on the transmission information (for example, the quantity of repeated transmissions of the SIB1) of the second system information, to improve system communication performance.

In a possible implementation, that the terminal device determines transmission information of second system information based on the DCI includes: The terminal device determines the transmission information of the second system information based on at least one bit included in the DCI.

For example, the terminal device may determine the transmission information of the second system information based on Q reserved bits included in the DCI. Q is an integer greater than or equal to 1. For example, Q=15.

In a possible implementation, the frequency domain resource information includes BWP information, where the BWP information is used to indicate a BWP in which the second system information is located; and/or the time domain resource information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain.

In a possible implementation, the first system information is an MIB, and the second system information is the SIB1. Alternatively, the first system information is the SIB1, and the second system information is OSI.

According to a fourth aspect, an embodiment of this application provides a communication method, including: A network device sends first information, where a quantity of transmissions of the first information is N, the N pieces of first information are used to determine second information or transmission information of the second information, and N is an integer greater than 1. The first information includes M bits, and M is an integer greater than or equal to 1.

In a possible implementation, some or all bits in the N pieces of first information are used to determine the second information or the transmission information of the second information.

In a possible implementation, the transmission information of the second information includes at least one of the following information: a quantity of repeated transmissions of the second information, a quantity of repeated transmissions of scheduling information of the second information, frequency domain resource information of the second information, or time domain resource information of the second information.

In a possible implementation, the frequency domain resource information includes bandwidth part (BWP) information, where the BWP information is used to indicate a BWP in which the second information is located; and/or the time domain resource information is used to indicate at least one of the following information: a time domain position of the second information, whether the second information is continuously scheduled, periodically scheduled, or scheduled according to a preset rule in time domain, and scheduling duration or a scheduling periodicity of the second information in time domain.

In a possible implementation, the first information is carried in an MIB, and the second information is an SIB1. Alternatively, the first information is carried in an SIB1, and the second information is OSI.

According to a fifth aspect, an embodiment of this application provides a communication method, including: A network device sends first system information, where the first system information includes indication information, and the indication information is used to determine transmission information of second system information. There is a correspondence between a type of a terminal device and the transmission information of the second system information, where the transmission information of the second system information includes at least one of the following information: a quantity of repeated transmissions of the second system information, a quantity of repeated transmissions of scheduling information of the second system information, frequency domain resource information of the second system information, or time domain resource information of the second system information.

In a possible implementation, the frequency domain resource information includes BWP information, where the BWP information is used to indicate a BWP in which the second system information is located; and/or the time domain resource information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain.

In a possible implementation, the first system information is an MIB, and the second system information is an SIB1. Alternatively, the first system information is an SIB1, and the second system information is OSI.

According to a sixth aspect, an embodiment of this application provides a communication method, including: A network device sends first system information; and the network device sends DCI based on the first system information, where the DCI is used to determine transmission information of second system information, and the transmission information of the second system information includes at least one of the following information: a quantity of repeated transmissions of the second system information, a quantity of repeated transmissions or continuous scheduling time of scheduling information of the second system information, frequency domain resource information of the second system information, or time domain resource information of the second system information.

In a possible implementation, at least one bit included in the DCI is used to determine the transmission information of the second system information.

In a possible implementation, the frequency domain resource information includes BWP information, where the BWP information is used to indicate a BWP in which the second system information is located; and/or the time domain resource information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain.

In a possible implementation, the first system information is an MIB, and the second system information is an SIB1. Alternatively, the first system information is an SIB1, and the second system information is OSI.

According to a seventh aspect, an embodiment of this application provides a communication apparatus, including: a receiving unit, configured to receive first information, where a quantity of transmissions of the first information is N, and N is an integer greater than 1; and a determining unit, configured to determine second information or transmission information of the second information based on the first information, where the first information includes M bits, and M is an integer greater than or equal to 1. The communication apparatus may be a terminal device, or may be a chip, an integrated circuit, or a functional apparatus in the terminal device.

In a possible implementation, the determining unit is configured to determine the second information or the transmission information of the second information based on some or all bits in the received N pieces of first information.

In a possible implementation, the transmission information of the second information includes at least one of the following information: a quantity of repeated transmissions of the second information, a quantity of repeated transmissions of scheduling information of the second information, frequency domain resource information of the second information, or time domain resource information of the second information.

In a possible implementation, the frequency domain resource information includes BWP information, where the BWP information is used to indicate a BWP in which the second information is located; and/or the time domain resource information is used to indicate at least one of the following information: a time domain position of the second information, whether the second information is continuously scheduled, periodically scheduled, or scheduled according to a preset rule in time domain, and scheduling duration or a scheduling periodicity of the second information in time domain.

In a possible implementation, the determining unit is configured to determine a second bit in the received N pieces of first information based on a first bit in the received N pieces of first information, where the first bit is used to indicate location information of the second bit. The terminal device determines the second information or the transmission information of the second information based on the second bit.

In a possible implementation, the first information is carried in an MIB, and the second information is an SIB1. Alternatively, the first information is carried in an SIB1, and the second information is OSI.

According to an eighth aspect, an embodiment of this application provides a communication apparatus, including: a receiving unit, configured to receive first system information, where the first system information includes indication information; and a determining unit, configured to determine transmission information of second system information based on the indication information. There is a correspondence between a type of a terminal device and the transmission information of the second system information, where the transmission information of the second system information includes at least one of the following information: a quantity of repeated transmissions of the second system information, a quantity of repeated transmissions of scheduling information of the second system information, frequency domain resource information of the second system information, or time domain resource information of the second system information. The communication apparatus may be the terminal device, or may be a chip, an integrated circuit, or a functional apparatus in the terminal device.

In a possible implementation, the type of the terminal device includes one or more of the following types: user equipment, a wearable device, an active IoT device, or a passive IoT device used in an enhanced mobile broadband (eMBB) communication system, a narrowband (NB) communication system, an internet of things (IoT) communication system, a massive machine-type communication (mMTC) system, or a lightweight new radio (NR) communication system.

In a possible implementation, the frequency domain resource information includes BWP information, where the BWP information is used to indicate a BWP in which the second system information is located; and/or the time domain resource information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain.

In a possible implementation, the first system information is an MIB, and the second system information is an SIB1. Alternatively, the first system information is an SIB1, and the second system information is OSI.

According to a ninth aspect, an embodiment of this application provides a communication apparatus, including: a receiving unit, configured to receive first system information, where the receiving unit is further configured to receive DCI based on the first system information; and a determining unit, configured to determine transmission information of second system information based on the DCI. The transmission information of the second system information includes at least one of the following information: a quantity of repeated transmissions of the second system information, a quantity of repeated transmissions or continuous scheduling time of scheduling information of the second system information, frequency domain resource information of the second system information, or time domain resource information of the second system information. The communication apparatus may be a terminal device, or may be a chip, an integrated circuit, or a functional apparatus in the terminal device.

In a possible implementation, the determining unit is configured to determine the transmission information of the second system information based on at least one bit included in the DCI.

In a possible implementation, the frequency domain resource information includes BWP information, where the BWP information is used to indicate a BWP in which the second system information is located; and/or the time domain resource information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain.

In a possible implementation, the first system information is an MIB, and the second system information is an SIB1. Alternatively, the first system information is an SIB1, and the second system information is OSI.

According to a tenth aspect, an embodiment of this application provides a communication apparatus, including: a sending unit, configured to send first information, where a quantity of transmissions of the first information is N, the N pieces of first information are used to determine second information or transmission information of the second information, and N is an integer greater than 1. The first information includes M bits, and M is an integer greater than or equal to 1. The communication apparatus may be a network device, or may be a chip, an integrated circuit, or a functional apparatus in the network device.

In a possible implementation, some or all bits in the N pieces of first information are used to determine the second information or the transmission information of the second information.

In a possible implementation, the transmission information of the second information includes at least one of the following information: a quantity of repeated transmissions of the second information, a quantity of repeated transmissions of scheduling information of the second information, frequency domain resource information of the second information, or time domain resource information of the second information.

In a possible implementation, the frequency domain resource information includes bandwidth part (BWP) information, where the BWP information is used to indicate a BWP in which the second information is located; and/or the time domain resource information is used to indicate at least one of the following information: a time domain position of the second information, whether the second information is continuously scheduled, periodically scheduled, or scheduled according to a preset rule in time domain, and scheduling duration or a scheduling periodicity of the second information in time domain.

In a possible implementation, the first information is carried in an MIB, and the second information is an SIB1.

Alternatively, the first information is carried in an SIB1, and the second information is OSI.

According to an eleventh aspect, an embodiment of this application provides a communication apparatus, including: a sending unit, configured to send first system information, where the first system information includes indication information, and the indication information is used to determine transmission information of second system information. There is a correspondence between a type of a terminal device and the transmission information of the second system information, where the transmission information of the second system information includes at least one of the following information: a quantity of repeated transmissions of the second system information, a quantity of repeated transmissions of scheduling information of the second system information, frequency domain resource information of the second system information, or time domain resource information of the second system information. The communication apparatus may be a network device, or may be a chip, an integrated circuit, or a functional apparatus in the network device.

In a possible implementation, the frequency domain resource information includes BWP information, where the BWP information is used to indicate a BWP in which the second system information is located; and/or the time domain resource information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain.

In a possible implementation, the first system information is an MIB, and the second system information is an SIB1. Alternatively, the first system information is an SIB1, and the second system information is OSI.

According to a twelfth aspect, an embodiment of this application provides a communication apparatus, including: a sending unit, configured to send first system information, where the sending unit is further configured to send DCI based on the first system information, and the DCI is used to determine transmission information of second system information. The transmission information of the second system information includes at least one of the following information: a quantity of repeated transmissions of the second system information, a quantity of repeated transmissions or continuous scheduling time of scheduling information of the second system information, frequency domain resource information of the second system information, or time domain resource information of the second system information. The communication apparatus may be a network device, or may be a chip, an integrated circuit, or a functional apparatus in the network device.

In a possible implementation, at least one bit included in the DCI is used to determine the transmission information of the second system information.

In a possible implementation, the frequency domain resource information includes BWP information, where the BWP information is used to indicate a BWP in which the second system information is located; and/or the time domain resource information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain.

In a possible implementation, the first system information is an MIB, and the second system information is an SIB1. Alternatively, the first system information is an SIB1, and the second system information is OSI.

According to a thirteenth aspect, an apparatus is provided, and includes: a processor and a memory. The memory is configured to store computer-executable instructions, and the processor executes the computer-executable instructions stored in the memory, to enable the apparatus to perform the communication method according to any implementation of the foregoing aspects.

According to a fourteenth aspect, a communication apparatus is provided, and includes a processor. The processor is coupled to a memory and reads instructions in the memory, to perform the communication method based on the instructions according to any implementation of the foregoing aspects.

According to a fifteenth aspect, a computer-readable storage medium is provided. The computer-readable storage medium stores instructions; and when the instructions are run on a computer, the computer is enabled to perform the communication method according to any implementation of the foregoing aspects.

According to a sixteenth aspect, a computer program product including instructions is provided. When the instructions are run on a computer, the computer is enabled to perform the communication method according to any implementation of the foregoing aspects.

According to a seventeenth aspect, a circuit system is provided. The circuit system includes a processing circuit, and the processing circuit is configured to perform the communication method according to any implementation of the foregoing aspects.

According to an eighteenth aspect, a chip is provided, where the chip includes a processor. The processor is coupled to a memory, and the memory stores program instructions. When the program instructions stored in the memory are executed by the processor, the communication method according to any implementation of the foregoing aspects is implemented.

According to a nineteenth aspect, a communication system is provided. The communication system includes: the communication apparatus according to any implementation of the seventh aspect and the tenth aspect, the communication apparatus according to any implementation of the eighth aspect and the eleventh aspect, or the communication apparatus according to any implementation of the ninth aspect and the tenth aspect.

DESCRIPTION OF EMBODIMENTS

Embodiments of this application provide a communication method and apparatus, which can be applied to a $4^{th}$ generation (4G) mobile communication system, a $5^{th}$ generation (5G) mobile communication system, or a future mobile communication system such as a $6^{th}$ generation (6G) or a $7^{th}$ generation (7G) communication system. For example, the communication method and apparatus can be applied to an enhanced mobile broadband (eMBB) communication system, an NB communication system, an IoT communication system, and a massive machine-type communication (mMTC) system or a lightweight NR communication system in 5G.

Figure 1:
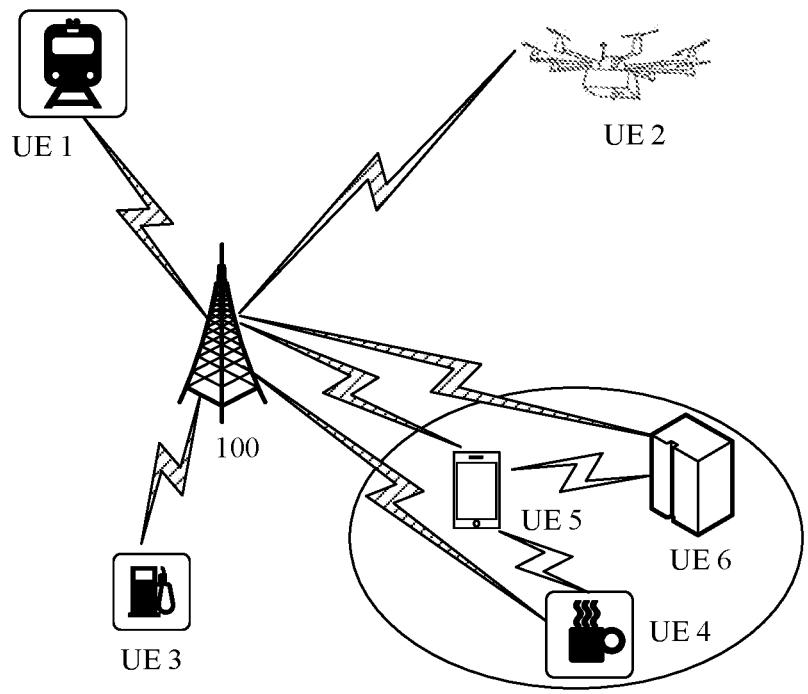
FIG. 1 is a schematic diagram of a communication system according to an embodiment of this application.

FIG. 1 is a schematic diagram of a communication system to which the technical solutions provided in some embodiments of this application are applicable. The communication system may include one or more network devices (for example, a base station 100) and one or more terminal devices (for example, user equipment (UE) 1 to UE 6) of different types connected to the base station 100. The UE 1 may be a vehicle terminal, the UE 2 may be an uncrewed aerial vehicle, the UE 3 may be a smart fuel dispenser, the UE 4 may be a smart coffee machine, the UE 5 may be a mobile phone, and the UE 6 may be a smart printer. The base station 100 may send information (for example, system information) to the UE 1 to the UE 6, and the UE 1 to the UE 6 may receive the information sent by the base station 100.

In a possible implementation, a system architecture in the embodiments of this application may include the UE 4, the UE 5, and the UE 6. In the communication system, the UE 5 may send information to the UE 4 and the UE 6, and the UE 4 and the UE 6 may receive the information sent by the UE 5.

The terminal device may be a desktop computer, a portable computer, a network server, a personal digital assistant (PDA), a mobile phone, a tablet, a wireless terminal device, a communication device, an embedded device, or the like. Alternatively, the terminal device may be UE in vehicle-to-everything (vehicle to X, V2X) communication, a terminal device in a device-to-device (D2D) communication system, a terminal device in an MTC communication system, or the like. For example, the terminal device may be various vehicle-mounted terminals or a transportation apparatus with a built-in computer. The transportation apparatus is, for example a traffic signal light, a street lamp, or an electronic eye. This is not limited herein.

The network device may be a base station, and the base station may be a device that can communicate with the terminal device. For example, the base station 100 may be a base transceiver station (BTS) in global system for mobile communication (GSM) or code division multiple access (CDMA), may be a NodeB (NB) in wideband code division multiple access (WCDMA), may be an evolved NodeB (evolutional Node B, eNB, or eNodeB) in LTE, or may be a base station (gNB) in NR, a relay station, an access point, or a base station in a future 5G network. This is not limited herein.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new service scenario, the technical solutions provided in the embodiments of this application are also applicable to a similar technical problem.

Figure 2:
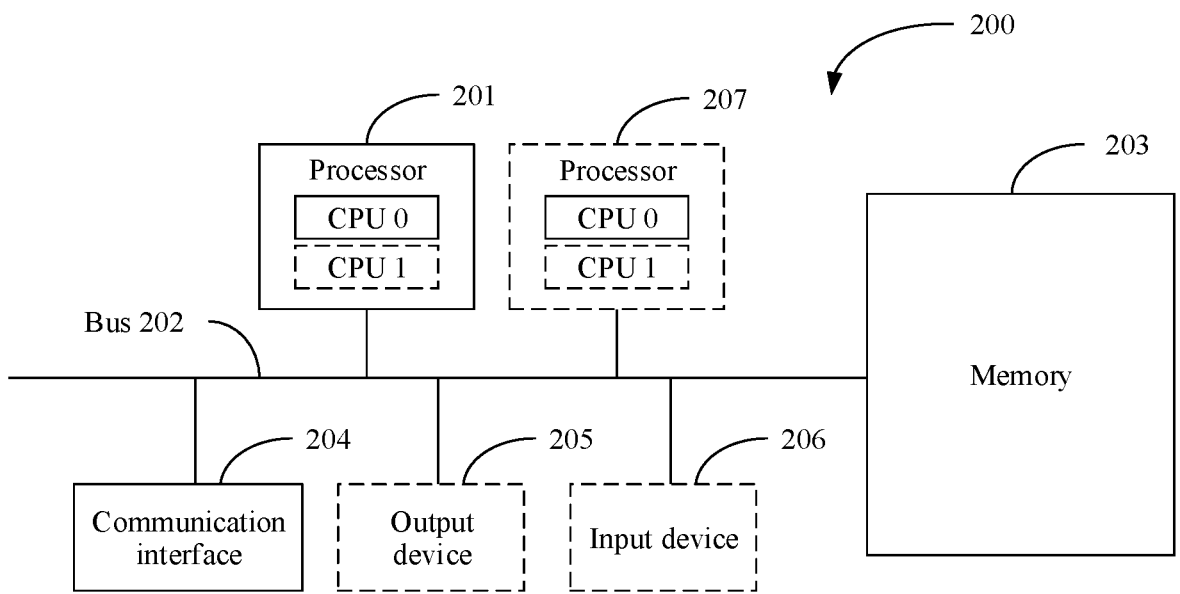
FIG. 2 is a schematic diagram of a structure of a terminal device according to an embodiment of this application.

For example, an apparatus for implementing a function of the terminal device provided in the embodiments of this application may be implemented by an apparatus 200 in FIG. 2. FIG. 2 is a schematic diagram of a hardware structure of the apparatus 200 according to an embodiment of this application. The apparatus 200 includes at least one processor 201. The apparatus 200 may further include at least one communication interface 204. The apparatus 200 may further include a memory 203. Optionally, the apparatus 200 may further include a bus 202. The apparatus may be a terminal device, or may be a component, a chip system, a functional unit, or an integrated circuit in the terminal device. This is not specifically limited in this embodiment of this application. In this embodiment of this application, the chip system may include a chip, or may include a chip and another discrete component.

In this embodiment of this application, the processor may be a central processing unit (CPU), a general-purpose processor, a network processor (NP), a digital signal processor (DSP), a microprocessor, a microcontroller, or a programmable logic device (PLD). The processor may alternatively be any other apparatus having a processing function, for example, an application-specific integrated circuit (ASIC), a field programmable gate array (FPGA) or another programmable logic device, a transistor logic device, a hardware component, a software module, or any combination thereof.

Optionally, the bus 202 may be used to transmit information between the foregoing components.

The communication interface 204 is configured to communicate with another device or a communication network, for example, the Ethernet, a radio access network (RAN), a wireless local area network (WLAN), or the like. The communication interface 204 may be an interface, a circuit, a transceiver, or any apparatus that can implement communication. Alternatively, the communication interface 204 may be an interface that provides input and output for the processor, for example, an interface that provides information or data for the processor and outputs a processing result of the processor. This is not limited in this application. The communication interface 204 may be coupled to the processor 201. The coupling in the embodiments of this application may be an indirect coupling or a communication connection between apparatuses, units, or modules in an electrical form, a mechanical form, or another form, and is used for information exchange between the apparatuses, the units, or the modules.

In the embodiments of this application, the memory may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray optical disc, or the like), or a magnetic disk storage medium or another magnetic storage device, or any other medium that can be used to carry or store expected program code in a form of instructions or a data structure and that can be accessed by a computer. This is not limited herein. The memory may exist independently, or may be coupled to the processor, for example, by using the bus 202. Alternatively, the memory may be integrated with the processor.

The memory 203 is configured to store program instructions, and the processor 201 controls the execution, to implement the communication method provided in the following embodiments of this application. The processor 201 is configured to invoke and execute the instructions stored in the memory 203, to implement the communication method provided in the following embodiments of this application.

Optionally, computer-executable instructions in this embodiment of this application may also be referred to as application program code. This is not specifically limited in this embodiment of this application.

Optionally, the memory 203 may be included in the processor 201.

During specific implementation, in an embodiment, the processor 201 may include one or more CPUs, for example, a CPU 0 and a CPU 1 in FIG. 2.

During specific implementation, in an embodiment, the apparatus 200 may include a plurality of processors, for example, the processor 201 and a processor 207 in FIG. 2. Each of the processors may be a single-core (single-CPU) processor or a multi-core (multi-CPU) processor. The processor herein may be one or more devices, circuits, and/or processing cores configured to process data (for example, computer program instructions).

During specific implementation, in an embodiment, the apparatus 200 may further include an output device 205 and an input device 206. The output device 205 is coupled to the processor 201, and may display information in a plurality of manners. For example, the output device 205 may be a liquid crystal display (LCD), a light emitting diode (LED) display device, a cathode ray tube (CRT) display device, or a projector. The input device 206 is coupled to the processor 201, and may receive input of a user in a plurality of manners. For example, the input device 206 may be a touchscreen device or a sensor device.

Figure 3:
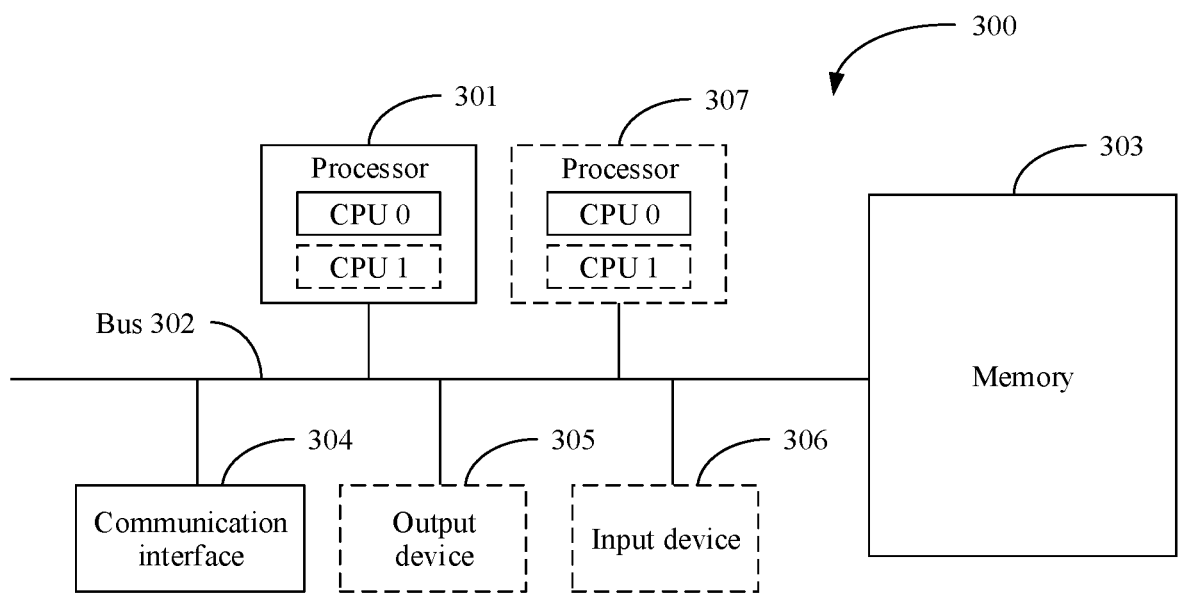
FIG. 3 is a schematic diagram of a structure of a network device according to an embodiment of this application.

For example, an apparatus for implementing a function of the network device provided in the embodiments of this application may be implemented by an apparatus 300 in FIG. 3. FIG. 3 is a schematic diagram of a hardware structure of the apparatus 300 according to an embodiment of this application. The apparatus 300 includes at least one processor 301. The apparatus 300 may further include at least one communication interface 304. The apparatus 300 may further include a memory 303. Optionally, the apparatus 300 may further include a bus 302. The apparatus may be a network device, or may be a component, a chip system, a functional unit, or an integrated circuit in the network device. This is not specifically limited in this embodiment of this application. In this embodiment of this application, the chip system may include a chip, or may include a chip and another discrete component.

Optionally, the bus 302 may be used to transmit information between the foregoing components.

The communication interface 304 is configured to communicate with another device or a communication network, for example, the Ethernet, a RAN, or a WLAN. The communication interface 304 may be an interface, a circuit, a transceiver, or any apparatus that can implement communication. Alternatively, the communication interface 304 may be an interface that provides input and output for the processor, for example, an interface that provides information or data for the processor and outputs a processing result of the processor. This is not limited in this application. The communication interface 304 may be coupled to the processor 301.

The memory 303 is configured to store program instructions, and the processor 301 controls the execution, to implement the communication method provided in the following embodiments of this application. For example, the processor 301 is configured to invoke and execute the instructions stored in the memory 303, to implement the communication method provided in the following embodiments of this application.

Optionally, the memory 303 may be included in the processor 301.

During specific implementation, in an embodiment, the processor 301 may include one or more CPUs, for example, a CPU 0 and a CPU 1 in FIG. 3.

During specific implementation, in an embodiment, the apparatus 300 may include a plurality of processors, for example, the processor 301 and a processor 307 in FIG. 3. Each of the processors may be a single-core processor or a multi-core processor. The processor herein may be one or more devices, circuits, and/or processing cores configured to process data (for example, computer program instructions).

During specific implementation, in an embodiment, the apparatus 300 may further include an output device 305 and an input device 306. The output device 305 is coupled to the processor 301, and may display information in a plurality of manners. For example, the output device 305 may be an LCD, an LED display device, a CRT display device, or a projector. The input device 306 is coupled to the processor 301, and may receive input of a user in a plurality of manners. For example, the input device 306 may be a touchscreen device or a sensor device.

The following describes a process in which a terminal device receives system information.

Figure 4:
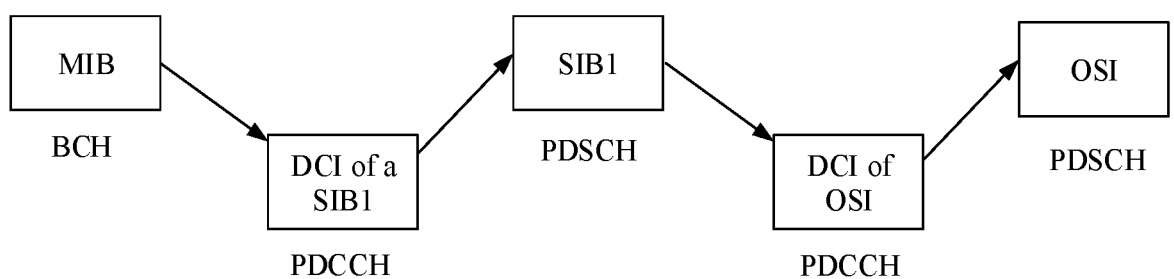
FIG. 4 is a schematic flowchart of monitoring system information according to an embodiment of this application.

As shown in FIG. 4, after receiving an MIB on a broadcast channel (BCH), the terminal device may receive, on a specified physical downlink control channel (PDCCH) based on information in the MIB, DCI for scheduling an SIB1, and then receive the SIB1 on a physical downlink shared channel (PDSCH) based on content of the DCI. Then, the terminal device may receive, on a specified PDCCH based on information in the SIB1, DCI for scheduling OSI, and then receive the OSI on the PDSCH based on content of the DCI.

Currently, in a scenario such as NB communication, MTC communication, IoT communication, or lightweight NR communication, a distribution environment of the terminal device is remote or complex, and a success rate of information (for example, the system information) transmission is low. The success rate of information transmission may be improved by increasing a coverage area of communication of a base station. A feasible method for increasing the coverage area of communication of the base station is as follows: When the base station sends various control information, a technical solution of repeatedly sending the control information is used.

For example, in a scheduling process of the SIB1, the base station may repeatedly send the DCI for scheduling the SIB1, and/or repeatedly transmit the SIB1 for a plurality of times, so that the coverage area of communication of the base station is increased through repeated transmission, to improve the success rate of information (for example, the SIB1) transmission. When repeatedly sending information, the base station needs to indicate a quantity of repeated sending times of each type of information (for example, the SIB1 or the DCI for scheduling the SIB1) to the terminal device. On one hand, this can prevent the terminal device from missing detecting information when the terminal device does not know a quantity of repeated transmissions of the information. On the other hand, this can prevent the terminal device from keeping detecting the information when the terminal device does not know the quantity of repeated transmissions of the information, thereby reducing power consumption of the terminal device. Therefore, how to indicate the quantity of repeated sending times of each type of information becomes an urgent problem to be resolved.

To resolve the foregoing problem, the embodiments of this application provide a communication method. A terminal device may receive first information transmitted for N times, and determine second information or transmission information (for example, a quantity of transmissions of an SIB1) of the second information based on the N pieces of first information. An amount of information indicated by the first information can be increased in a time division manner without changing a size of the first information. The terminal device may determine the second information or the transmission information (for example, a quantity of repeated transmissions of the SIB1) of the second information based on the N pieces of first information, so that the terminal device receives the second information based on the transmission information of the second information. This maximally ensures that the terminal device correctly receives information (the second information, for example, the SIB1), to improve system communication performance.

It should be noted that, in the first information transmitted for N times, content of the first information transmitted for an $S^{th}$ time may be the same as or different from content of the first information transmitted for an $(S+1)^{th}$ time, where $S<N$, and $S+1\leq N$.

Alternatively, a terminal device may determine transmission information (for example, a quantity of repeated transmissions of an SIB1) of second system information based on indication information in first system information (for example, an MIB). There is a correspondence between a type of the terminal device and the transmission information of the second system information. In this way, terminal devices of different types may more accurately receive the second system information (for example, the SIB1) based on the transmission information (for example, the quantity of repeated transmissions of the SIB1) of the second system information, to improve system communication performance.

Alternatively, a terminal device may receive DCI based on first system information, and determine transmission information (for example, a quantity of repeated transmissions of an SIB1) of second system information (for example, the SIB1) based on the DCI. In this way, the terminal device may more accurately receive the second system information (for example, the SIB1) based on the transmission information (for example, the quantity of repeated transmissions of the SIB1) of the second system information, to improve system communication performance.

The following describes technical solutions in the embodiments of this application with reference to accompanying drawings in the embodiments of this application. In descriptions of this application, unless otherwise specified, "at least one" means one or more, and "a plurality of" means two or more. In addition, to clearly describe the technical solutions in the embodiments of this application, terms such as "first" and "second" are used in the embodiments of this application to distinguish between same items or similar items that provide basically same functions or purposes. A person skilled in the art may understand that terms such as "first" and "second" do not limit a quantity or an execution sequence, and terms such as "first" and "second" do not indicate a definite difference.

It should be noted that, in the embodiments of the present disclosure, "of", "relevant", and "corresponding" may be interchangeably used sometimes, "signaling" and "message" may be interchangeably used sometimes. It should be noted that, when a difference thereof is not emphasized, meanings to be expressed are consistent.

Names of messages between network elements or names of parameters in messages in the following embodiments of this application are merely examples, and may alternatively be other names during specific implementation. This is not specifically limited in the embodiments of this application.

For ease of understanding, the following specifically describes the communication method provided in the embodiments of this application with reference to the accompanying drawings.

Figure 5:
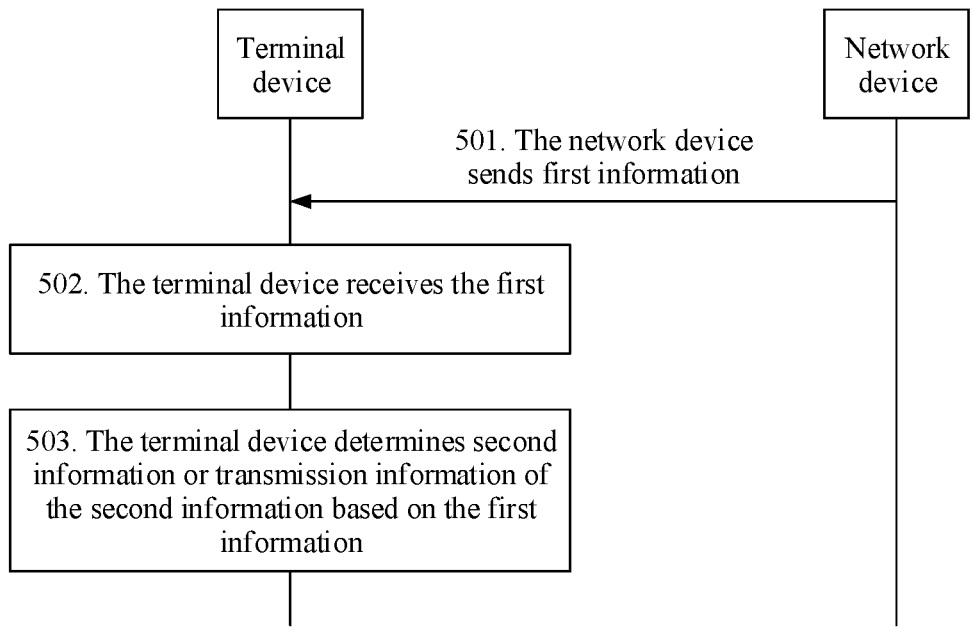
FIG. 5 is a schematic diagram of signal exchange in a communication method according to an embodiment of this application.

As shown in FIG. 5, an embodiment of this application provides a communication method, including the following steps.

501. A network device sends first information, where a quantity of transmissions of the first information is N, and N is an integer greater than 1.

502. A terminal device receives the first information, where the quantity of transmissions of the first information is N, and N is an integer greater than 1.

That is, the terminal device may receive N pieces of first information. The N pieces of first information may include first information transmitted for a plurality of times in one time window, first information transmitted for a plurality of times in one transmission periodicity, first information transmitted for a plurality of times in a plurality of time windows, first information transmitted for a plurality of times in a plurality of transmission periodicities, or first information transmitted for a plurality of times within preset duration. This is not limited in this application.

It should be noted that, in the N pieces of first information, content of the first information transmitted for an $S^{th}$ time may be the same as or different from content of the first information transmitted for an $(S+1)^{th}$ time, where $S<N$, and $S+1\leq N$. That is, for the first information transmitted for the plurality of times, content of the first information transmitted each time is not limited to be the same.

Each piece of first information in the N pieces of first information may include M bits, where M is an integer greater than or equal to 1. For example, in a system information transmission scenario, the first information may be carried in an MIB. For example, the first information may be one bit in the MIB, that is, M=1. The quantity of transmissions of the first information may be a quantity of transmissions of the MIB in one transmission periodicity.

For example, one transmission periodicity of the MIB may be 80 ms, and within the 80 ms, the MIB may be repeatedly transmitted for a plurality of times based on a transmission periodicity of a synchronization signal block (SSB). If the transmission periodicity of the SSB is 20 ms, the MIB may be repeatedly sent for four times in one transmission periodicity, that is, the first information may be repeatedly transmitted for four times, and N=4. It should be noted that repeated transmission in this embodiment of this application is merely used to indicate that information may be transmitted for a plurality of times, and content of the information transmitted each time is not limited to be the same.

Alternatively, the first information may be carried in an SIB1, for example, the first information may be M bits in the SIB1. For example, the first information may be the first M bits, the last M bits, or the middle M bits in the SIB1. This is not limited in this application. The quantity of transmissions of the first information may be a quantity of transmissions of the SIB1 in one transmission periodicity.

It should be noted that this embodiment of this application may not be applied only to the system information transmission scenario, that is, the first information may not be carried only in the MIB and the SIB1. This embodiment may also be applied to a non-system information transmission scenario, that is, the first information may be carried in other information or signaling. This is not limited in this application.

503. The terminal device determines second information or transmission information of the second information based on the first information.

The terminal device determines the second information or the transmission information of the second information based on some or all bits in the received N pieces of first information.

The some or all bits in the N pieces of first information may form a bitmap, and the bitmap may be used to indicate the second information or the transmission information of the second information.

For example, in the system information transmission scenario, the second information may be an SIB1 or OSI. If the first information is carried in the MIB, the second information may be the SIB1. Alternatively, if the first information is carried in the SIB1, the second information may be the OSI.

Figure 6A:
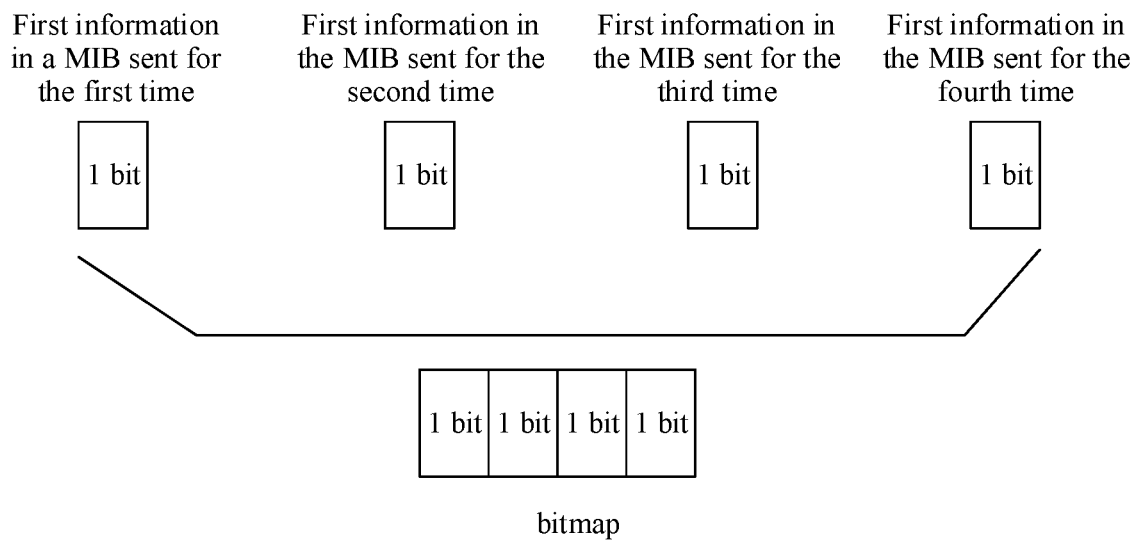
FIG. 6A is a schematic diagram of a bitmap according to an embodiment of this application.

For example, as shown in FIG. 6A, if the first information is one bit in the MIB, and the MIB is repeatedly sent for four times in one transmission periodicity, the terminal device may continuously receive the MIB for four times, one bit carried in each of the four MIBs may jointly form a bitmap, and the terminal device may determine transmission information of the SIB1 based on the bitmap.

Figure 6B:
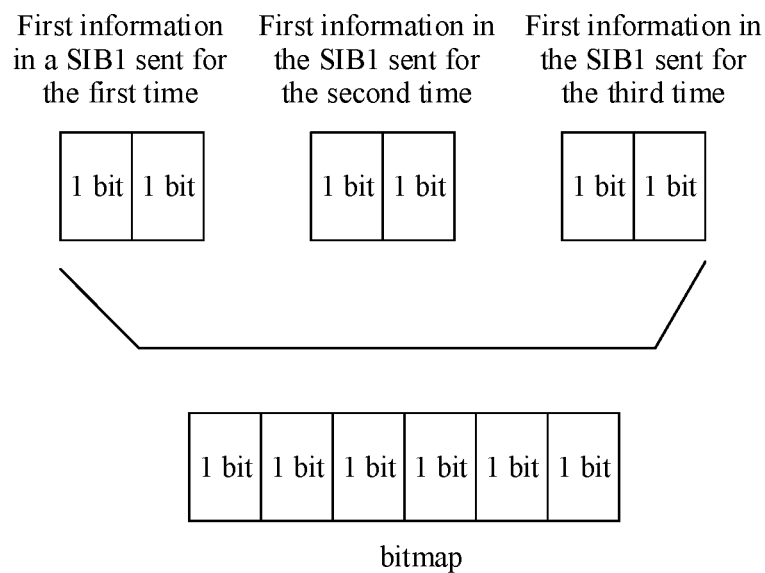
FIG. 6B is another schematic diagram of a bitmap according to an embodiment of this application.

For another example, as shown in FIG. 6B, if the first information is two bits in the SIB1, and the SIB1 is repeatedly sent for three times in one transmission periodicity, the terminal device may continuously receive the MIB for three times, two bits carried in each of the three SIB1s may jointly form a bitmap, and the terminal device may determine transmission information of the OSI based on the bitmap.

In the system information transmission scenario, if the terminal device does not receive all corresponding system information in a time window that is used to receive the system information or in a transmission periodicity of the system information, the terminal device continues to receive the system information in a subsequent time window or transmission periodicity, forms, based on a sequence of the system information in a time window or a transmission periodicity, a complete bitmap by using first information carried in the system information received in different time windows or different transmission periodicities, and determines the second information or the transmission information of the second information based on the bitmap.

For example, if the N pieces of first information include all first information transmitted in one time window, when the terminal device does not receive the system information from a start location of a first time window in time but starts to receive the system information only after a first time interval since the first time window starts and receives the system information twice, the terminal device may continue to receive the system information in a next time window (a second time window), and receive the system information once before the first time interval since the second time window starts. The terminal device may sequentially form a complete bitmap (where in the bitmap, the first information in the system information received in the second time window is before the first information in the system information received in the first time window) by using the first information carried in the system information received before the first time interval since the second time window starts and the first information in the system information received in the first time window, and the terminal device determines the second information or the transmission information of the second information based on the bitmap.

In this way, the transmission information (for example, a quantity of repeated transmissions of the SIB1) of the second information may be indicated by combining the first information in the MIB (for example, a bit in the MIB) that is repeatedly transmitted for a plurality of times in time domain, and a format of the MIB does not need to be changed. Alternatively, the transmission information (for example, a quantity of repeated transmissions of the OSI) of the second information may be indicated by combining the first information in the SIB1 (for example, M bits in the SIB1) that is repeatedly transmitted for a plurality of times in time domain, and a format of the SIB1 does not need to be changed. It should be noted that this time domain extension method is not limited to the MIB and the SIB scenarios. In another scenario, other information (the transmission information of the second information) may alternatively be indicated by combining the first information that is sent for a plurality of times in time domain. A specific application scenario is not limited in this application.

In a possible design, the terminal device determines a second bit in the received N pieces of first information based on a first bit in the received N pieces of first information, where the first bit is used to indicate location information of the second bit. A location of the first bit in the bitmap may be preconfigured (or predefined in a protocol).

For example, if the first information includes three bits, and the first information is repeatedly sent for five times, the terminal device may form a bitmap by using 3*5=15 bits of the first information that is repeatedly sent for five times. The first three bits (the first bit) of the bitmap may indicate that the middle five bits (the second bit) of the bitmap are used to indicate the transmission information of the second information.

In this way, the terminal device may learn of a bit quantity of the second bit and/or a location of the second bit in the bitmap by reading the first bit, and then specifically read the second bit, to determine the second information or the transmission information of the second information based on the second bit without reading the entire bitmap.

The transmission information of the second information may include at least one of the following information: a quantity of repeated transmissions of the second information, a quantity of repeated transmissions of scheduling information of the second information, frequency domain resource information of the second information, or time domain resource information of the second information.

The terminal device may determine, based on the quantity of repeated transmissions of the second information, duration for monitoring the second information, and monitor the second information within the duration. The terminal device may determine, based on the quantity of repeated transmissions of the scheduling information of the second information, duration for monitoring the quantity of repeated transmissions of the scheduling information of the second information, and monitor the scheduling information of the second information within the duration, to obtain time-frequency resource information of the second information.

The frequency domain resource information includes BWP information, where the BWP information is used to indicate a BWP in which the second information is located. The second information may be transmitted on one or more BWPs. For example, some bits of the second information may be transmitted on a first BWP, and the other bits are transmitted on a second BWP. Alternatively, a $K^{th}$ transmission of the second information may be on a first BWP, where K is an integer greater than or equal to 1. A $P^{th}$ transmission of the second information may be on a second BWP, where P is an integer greater than or equal to 1. The first BWP is different from the second BWP, that is, the terminal device may receive the second information on different BWPs.

The time domain resource information of the second information is used to indicate at least one of the following information: a time domain position of the second information, whether the second information is continuously scheduled, periodically scheduled, or scheduled according to a preset rule in time domain, and scheduling duration or a scheduling periodicity of the second information in time domain.

The time domain position of the second information may include one time domain position of the second information that is sent once, may include a plurality of time domain positions of the second information that is sent for a plurality of times, or may be a time domain position of the second information that is sent for a specific time in the second information that is sent for a plurality of times, for example, a time domain position of the second information that is sent for the first time.

For example, assuming that the second information is sent once in time domain, and the time domain resource information of the second information may indicate only the time domain position of the second information, where the time domain position of the second information may be a slot or a subframe, the terminal device may receive the second information in the slot or the subframe. Assuming that the second information is periodically sent for a plurality of times in time domain, and the time domain resource information of the second information may indicate the time domain position of the second information, that the second information is periodically scheduled in time domain, and scheduling duration or a scheduling periodicity of the second information in time domain, where the time domain position of the second information may be the time domain position of the second information that is sent for the first time, the terminal device may infer, based on the time domain position and the scheduling periodicity (scheduling duration) of the second information that is sent for the first time, a time domain position of the second information that is subsequently sent, to receive the second information in a corresponding time domain position.

The scheduling of the second information in time domain according to the preset rule may be that the second information is scheduled based on a fixed pattern. For example, the pattern may indicate that the second information is transmitted in the $1^{st}$ ms, the $3^{rd}$ ms, and the $7^{th}$ ms, and the terminal device may receive the second information in corresponding time domain positions.

Based on the method provided in this embodiment of this application, when a quantity of bits of the first information (for example, one bit in the MIB) is small and is insufficient to indicate information (for example, an SIB or transmission information of the SIB), the first information transmitted for the N times may be combined in time domain in a time division manner to form indication information with more bits, to indicate more information. In this way, more content may be indicated when a size of the first information is limited. The terminal device may receive the first information transmitted for the N times, and determine the second information or the transmission information (for example, the quantity of repeated transmissions of the SIB1) of the second information based on the N pieces of first information. Then, the terminal device may receive the second information (for example, the SIB1) based on the transmission information (for example, the quantity of repeated transmissions of the SIB) of the second information. This maximally ensures that the terminal device correctly receives the second information, to improve system communication performance.

Figure 7:
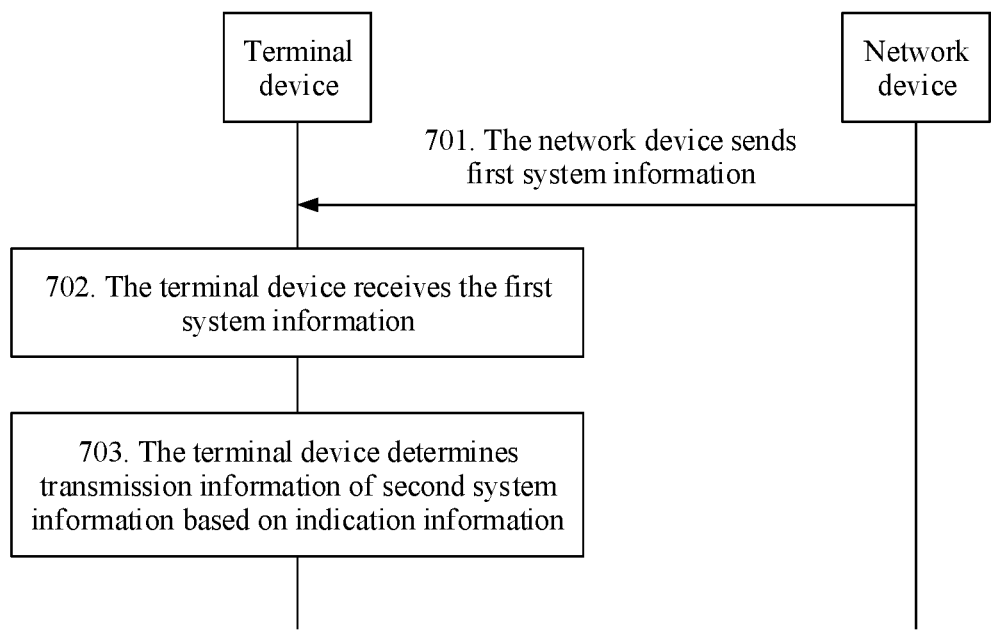
FIG. 7 is another schematic diagram of signal exchange in a communication method according to an embodiment of this application.

As shown in FIG. 7, an embodiment of this application provides a communication method, including the following steps.

701. A network device sends first system information, where the first system information includes indication information.

702. A terminal device receives the first system information, where the first system information includes the indication information.

For example, the first system information may be an MIB or an SIB1, and second system information may be an SIB1 or OSI. If the first system information is the MIB, the second system information may be the SIB1. Alternatively, if the first system information is the SIB1, the second system information may be the OSI.

The indication information may be an index or an identifier, and is used to indicate transmission information of the second system information.

703. The terminal device determines the transmission information of the second system information based on the indication information.

In a possible design, the transmission information of the second system information may be preconfigured, and there is a correspondence between the transmission information of the second system information and a type of the terminal device. The transmission information of the second system information and the correspondence between the transmission information of the second system information and the type of the terminal device may be preconfigured by using a collection, a matrix, a list (a table), an image, a function, a profile, or another form. This is not limited in this application.

The transmission information of the second system information includes at least one of the following information: a quantity of repeated transmissions of the second system information, a quantity of repeated transmissions of scheduling system information of the second system information, frequency domain resource system information of the second system information, or time domain resource system information of the second system information. The frequency domain resource system information of the second system information includes BWP system information, where the BWP system information is used to indicate a BWP in which the second system information is located. The time domain resource system information of the second system information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain. For specific descriptions, refer to step 503. Details are not described herein again.

The type of the terminal device includes one or more of the following types: user equipment, a wearable device, an active IoT device, or a passive IoT device used in an eMBB communication system, a narrowband (NB) communication system, an IoT communication system, an mMTC system, or a lightweight NR communication system. A distribution environment of the foregoing type of terminal device is usually remote and complex, and has a high requirement on a coverage area of communication of the network device (for example, a base station). Based on the method provided in this embodiment of this application, the terminal device may determine, based on the indication information in the first system information and the correspondence between the type of the terminal device and the transmission information of the second system information, transmission information of second system information corresponding to the type of the terminal device, to more accurately receive the second system information (for example, the SIB1) based on transmission information (for example, a quantity of repeated transmissions of the SIB1) of the second system information corresponding to the type of the terminal device. Consequently, the requirement of the terminal device on the coverage area of communication of the network device (for example, the base station) is met.

In a possible design, one or more tables may be specified (designed) in a protocol. Each table may correspond to one type of terminal device. After obtaining the indication information, terminal devices of different types may search for the transmission information (for example, a quantity of repeated transmissions) of the second system information in a table corresponding to the type of the terminal device based on the indication information.

For example, the second system information is the SIB1, and the transmission information of the SIB1 is the quantity of repeated transmissions of the SIB1. A table corresponding to the user equipment in the lightweight NR communication system may be shown as Table 1, and a table corresponding to the terminal device in the IoT communication system may be shown as Table 2. After receiving the indication information (for example, the index), the user equipment in the lightweight NR communication system may search the Table 1 based on the index and read the quantity of repeated transmissions of the SIB1. For example, if the user equipment in the lightweight NR communication system receives an index 1, the quantity of repeated transmissions of the SIB1 is 3. After receiving the indication information (for example, the index), the terminal device in the IoT communication system may search the Table 2 based on the index and read the quantity of repeated transmissions of the SIB1. For example, if the terminal device in the IoT communication system receives an index 1, the quantity of repeated transmissions of the SIB1 is 2.

TABLE 1

| Index | Pattern | $N_{RB}^{CORESE}$ | $N_{symb}^{CORESE}$ | Offset | Quantity of repeated transmissions of an SIB1 |
|---|---|---|---|---|---|
| 0 | 1 | 24 | 2 | 5 | 3 |
| 1 | 1 | 24 | 1 | 7 | 3 |
| ... | | | | | |
| n | 1 | 48 | 3 | 18 | 4 |

TABLE 2

| Index | Pattern | $N_{RB}^{CORESE}$ | $N_{symb}^{CORESE}$ | Offset | Quantity of repeated transmissions of an SIB1 |
|---|---|---|---|---|---|
| 0 | 1 | 24 | 2 | 5 | 2 |
| 1 | 1 | 24 | 1 | 7 | 2 |
| ... | | | | | |
| n | 1 | 48 | 3 | 18 | |

$N_{RB}^{CORESET}$ indicates a quantity of resource blocks (resource block, RB) (number of RBs).

$N_{symb}^{CORESET}$ indicates a quantity of symbols (number of symbols), pattern represents an SSB and CORESET multiplexing pattern (SS/PBCH block and CORESET multiplexing pattern), and offset represents an RB offset.

Based on the method provided in this embodiment of this application, the terminal device may determine the transmission information (for example, the quantity of repeated transmissions of the SIB1) of the second system information based on the indication information in the first system information (for example, the MIB). There is the correspondence between the type of the terminal device and the transmission information of the second system information. In this way, terminal devices of different types may more accurately receive the second system information (for example, the SIB1) based on the transmission information (for example, the quantity of repeated transmissions of the SIB1) of the second system information, to improve system communication performance.

Figure 8:
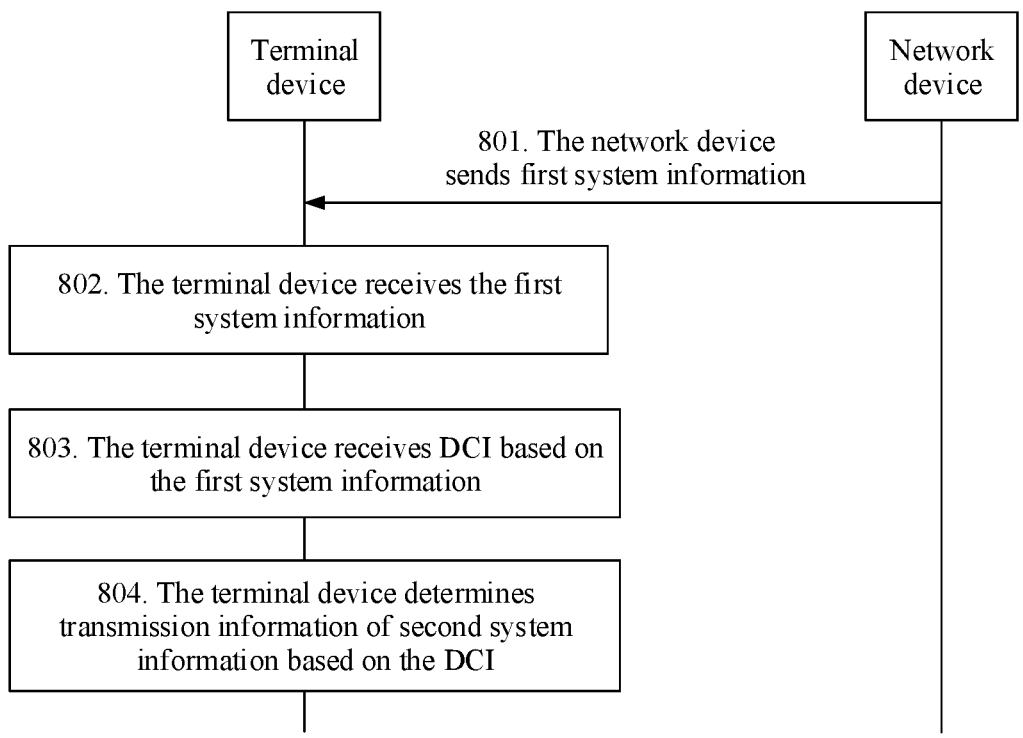
FIG. 8 is still another schematic diagram of signal exchange in a communication method according to an embodiment of this application.

As shown in FIG. 8, an embodiment of this application provides a communication method, including the following steps.

801. A network device sends first system information.

802. A terminal device receives the first system information.

For example, the first system information may be an MIB or an SIB1.

803. The terminal device receives DCI based on the first system information.

After receiving the first system information, the terminal device may receive the DCI on a specified PDCCH based on an indication of the first system information.

804. The terminal device determines transmission information of second system information based on the DCI.

For example, the second system information may be an SIB1 or OSI. If the first system information is the MIB, the second system information may be the SIB1. Alternatively, if the first system information is the SIB1, the second system information may be the OSI.

The terminal device may determine the transmission information of the second system information based on at least one bit included in the DCI. For example, the terminal device may determine the transmission information of the second system information based on Q reserved bits included in the DCI. Q is an integer greater than or equal to 1. For example, Q=15. It may be understood that if the reserved bits in the DCI are used to indicate the transmission information of the second system information, the reserved bits are no longer reserved bits, and the terminal device no longer ignores the bits.

In this way, the original reserved bits in the DCI may be used to indicate the transmission information (for example, a quantity of repeated transmissions of scheduling information of the SIB1 or the OSI) of the second system information (for example, the SIB1 or the OSI), the DCI does not need to be extended, and load (bit consumption) of the DCI does not increase.

The transmission information of the second system information may include at least one of the following information: a quantity of repeated transmissions of the second system information, a quantity of repeated transmissions of scheduling system information of the second system information, frequency domain resource system information of the second system information, or time domain resource system information of the second system information. The frequency domain resource system information of the second system information includes BWP system information, where the BWP system information is used to indicate a BWP in which the second system information is located. The time domain resource system information of the second system information is used to indicate at least one of the following information: a time domain position of the second system information, whether the second system information is continuously scheduled, periodically scheduled, or scheduled according to a preset rule in time domain, and scheduling duration or a scheduling periodicity of the second system information in time domain. For specific descriptions, refer to step 503. Details are not described herein again.

Based on the method provided in this embodiment of this application, the terminal device may receive the DCI based on the first system information, and determine the transmission information (for example, a quantity of repeated transmissions of the SIB1) of the second system information (for example, the SIB1) based on the DCI. Then, the terminal device may more accurately receive the second system information (for example, the SIB1) based on the transmission information (for example, the quantity of repeated transmissions of the SIB1) of the second system information, to improve system communication performance.

In the foregoing embodiments provided in this application, the methods provided in the embodiments of this application are described separately from perspectives of the terminal device, the network device, and interaction between the network device and the terminal device. To implement functions in the foregoing methods provided in the embodiments of this application, the terminal device and the network device may include a hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 9:
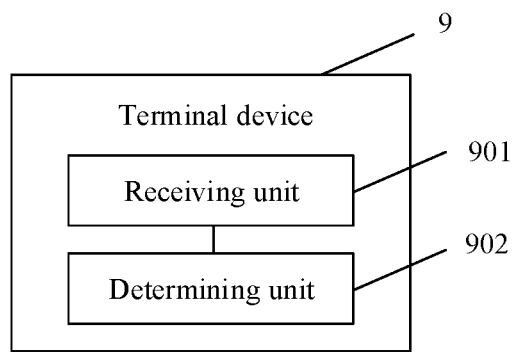
FIG. 9 is a schematic diagram of a structure of another terminal device according to an embodiment of this application.

When each functional module is obtained through division based on each corresponding function, FIG. 9 is a possible schematic diagram of a structure of an apparatus 9 in the foregoing embodiments. The apparatus may be a terminal device. The terminal device includes a receiving unit 901 and a determining unit 902.

In this embodiment of this application, the receiving unit 901 is configured to receive first information, where a quantity of transmissions of the first information is N, and N is an integer greater than 1. The determining unit 902 is configured to determine second information or transmission information of the second information based on the first information, where the first information includes M bits, and M is an integer greater than or equal to 1.

Alternatively, the receiving unit 901 is configured to receive first system information, where the first system information includes indication information. The determining unit 902 is configured to determine transmission information of second system information based on the indication information, where there is a correspondence between a type of the terminal device and the transmission information of the second system information, and the transmission information of the second system information includes at least one of the following information: a quantity of repeated transmissions of the second system information, a quantity of repeated transmissions of scheduling information of the second system information, frequency domain resource information of the second system information, or time domain resource information of the second system information.

Alternatively, the receiving unit 901 is configured to receive first system information, and the receiving unit 901 is further configured to receive DCI based on the first system information. The determining unit 902 is configured to determine transmission information of second system information based on DCI, and the transmission information of the second system information includes at least one of the following information: a quantity of repeated transmissions of the second system information, a quantity of repeated transmissions or continuous scheduling time of scheduling information of the second system information, frequency domain resource information of the second system information, or time domain resource information of the second system information.

In the method embodiments shown in FIG. 5, FIG. 7, and FIG. 8, the receiving unit 901 may be configured to support an access network device in performing the process 502 in FIG. 5, the process 702 in FIG. 7, and the processes 802 and 803 in FIG. 8. The determining unit 902 may be configured to support the access network device in performing the process 503 in FIG. 5, the process 703 in FIG. 7, and the process 804 in FIG. 8.

Figure 10:
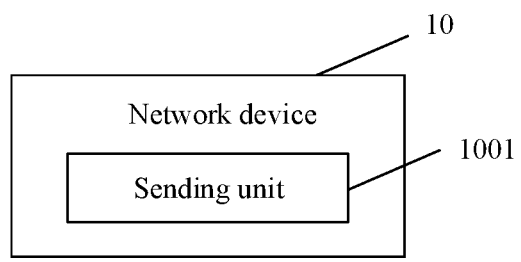
FIG. 10 is a schematic diagram of a structure of another network device according to an embodiment of this application.

When each functional module is obtained through division based on each corresponding function, FIG. 10 is a possible schematic diagram of a structure of an apparatus 10 in the foregoing embodiments. The apparatus may be a network device, and the network device includes a sending unit 1001.

In this embodiment of this application, the sending unit 1001 is configured to send first information, where a quantity of transmissions of the first information is N, the N pieces of first information is used to determine second information or transmission information of the second information, and N is an integer greater than 1. The first information includes M bits, and M is an integer greater than or equal to 1.

Alternatively, the sending unit 1001 is configured to send first system information, where the first system information includes indication information, and the indication information is used to determine transmission information of second system information. There is a correspondence between a type of a terminal device and the transmission information of the second system information, where the transmission information of the second system information includes at least one of the following information: a quantity of repeated transmissions of the second system information, a quantity of repeated transmissions of scheduling information of the second system information, frequency domain resource information of the second system information, or time domain resource information of the second system information.

Alternatively, the sending unit 1001 is configured to send first system information, and the sending unit is further configured to send DCI based on the first system information. The DCI is configured to determine transmission information of second system information, and the transmission information of the second system information includes at least one of the following information: a quantity of repeated transmissions of the second system information, a quantity of repeated transmissions or continuous scheduling time of scheduling information of the second system information, frequency domain resource information of the second system information, or time domain resource information of the second system information.

In the method embodiments shown in FIG. 5, FIG. 7, and FIG. 8, the sending unit 1001 may be configured to support the terminal device in performing the process 501 in FIG. 5, the process 701 in FIG. 7, and the process 801 in FIG. 8.

Division into modules in the embodiments of this application is an example, and is merely logical function division. During actual implementation, there may be another division manner. In addition, functional modules in the embodiments of this application may be integrated into one processor. Alternatively, each of the modules may exist alone physically, or at least two modules may be integrated into one module. The integrated module may be implemented in a form of hardware, or may be implemented in a form of a software functional module. For example, in the embodiments of this application, the receiving unit and the sending unit may be integrated into a transceiver unit.

All or some of the methods in the embodiments of this application may be implemented by using software, hardware, firmware, or any combination thereof. When software is used to implement the methods, all or some of the embodiments may be implemented in a form of a computer program product. The computer program product includes one or more computer instructions. When the computer program instructions are loaded and executed on a computer, the procedures or the functions according to the embodiments of the present disclosure are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It is clear that a person skilled in the art can make various modifications and variations to the embodiments of this application without departing from the spirit and scope of this application. This application is intended to cover these modifications and variations of the embodiments of this application provided that they fall within the scope of the claims of this application and equivalent technologies thereof.

What is claimed is:

1. A communication method, comprising:
   receiving, by a terminal device, N pieces of first information in N separate transmissions, wherein N is an integer greater than 1;
   determining, by the terminal device, second information or transmission information of the second information based on at least a part of the N pieces of the first information, wherein each of the N pieces of the first information comprises M bits, and M is an integer greater than or equal to 1;
   receiving, by the terminal device, a first system information;
   receiving, by the terminal device, downlink control information (DCI) based on the first system information; and
   determining, by the terminal device, transmission information of second system information based on the DCI, wherein the transmission information of the second system information comprises at least one of a quantity of repeated transmissions of the second system information, a quantity of repeated transmissions or continuous scheduling time of scheduling information of the second system information, frequency domain resource information of the second system information, or time domain resource information of the second system information, and wherein at least one of:
      the frequency domain resource information comprises bandwidth part (BWP) information, wherein the BWP information indicates a BWP in which the second system information is located; or
      the time domain resource information indicates at least one of the following information:
         a time domain position of the second system information;
         whether the second system information is continuously scheduled, periodically scheduled, or scheduled according to a preset rule in time domain; or
         scheduling duration or a scheduling periodicity of the second system information in time domain.

2. The communication method according to claim 1, wherein the determining, by the terminal device, second information or transmission information of the second information based on at least a part of the N pieces of the first information comprises:
   determining, by the terminal device, the second information or the transmission information of the second information based on some or all bits in the received N pieces of the first information.

3. The communication method according to claim 1, wherein the transmission information of the second information comprises at least one of the following information:
   a quantity of repeated transmissions of the second information, a quantity of repeated transmissions of scheduling information of the second information, frequency domain resource information of the second information, or time domain resource information of the second information.

4. The communication method according to claim 3, wherein at least one of:
   the frequency domain resource information comprises bandwidth part (BWP) information, wherein the BWP information indicates a BWP in which the second information is located; or
   the time domain resource information indicates at least one of the following information:
      a time domain position of the second information;
      whether the second information is continuously scheduled, periodically scheduled, or scheduled according to a preset rule in time domain; or
      scheduling duration or a scheduling periodicity of the second information in time domain.

5. The communication method according to claim 2, wherein the determining, by the terminal device, the second information or the transmission information of the second information based on some or all bits in the received N pieces of the first information comprises:
   determining, by the terminal device, a second bit in the received N pieces of the first information based on a first bit in the received N pieces of the first information, wherein the first bit indicates location information of the second bit; and
   determining, by the terminal device, the second information or the transmission information of the second information based on the second bit.

6. The communication method according to claim 1, wherein:
   each of the N pieces of the first information is carried in a master information block (MIB), and the second information is a system information block (SIB1); or
   each of the N pieces of the first information is carried in an SIB1, and the second information is other system information (OSI).

7. A communication method, comprising:
   receiving, by a terminal device, first system information, wherein the first system information comprises indication information;
   determining, by the terminal device, transmission information of second system information based on the indication information, wherein a type of the terminal device corresponds to the transmission information of the second system information, and the transmission information of the second system information comprises at least one of a quantity of repeated transmissions of the second system information, a quantity of repeated transmissions of scheduling information of the second system information, frequency domain resource information of the second system information, or time domain resource information of the second system information;
   receiving, by the terminal device, third system information;
   receiving, by the terminal device, downlink control information (DCI) based on the third system information; and
   determining, by the terminal device, transmission information of fourth system information based on the DCI, wherein the transmission information of the fourth system information comprises at least one of a quantity of repeated transmissions of the fourth system information, a quantity of repeated transmissions or continuous scheduling time of scheduling information of the fourth system information, frequency domain resource information of the fourth system information, or time domain resource information of the fourth system information, and wherein at least one of:
   the frequency domain resource information comprises bandwidth part (BWP) information, wherein the BWP information indicates a BWP in which the fourth system information is located; or
   the time domain resource information indicates at least one of the following information:
      a time domain position of the fourth system information;
      whether the fourth system information is continuously scheduled, periodically scheduled, or scheduled according to a preset rule in time domain; or
      scheduling duration or a scheduling periodicity of the fourth system information in time domain.

8. The communication method according to claim 7, wherein the type of the terminal device comprises one or more of the following types:
   user equipment, a wearable device, an active Internet of Things (IoT) device, or a passive IoT device used in an enhanced mobile broadband (eMBB) communication system, a narrowband (NB) communication system, an IoT communication system, a massive machine-type communication (mMTC) system, or a lightweight new radio (NR) communication system.

9. The communication method according to claim 7, wherein at least one of:
   the frequency domain resource information comprises bandwidth part (BWP) information, wherein the BWP information indicates a BWP in which the second system information is located; or
   the time domain resource information indicates at least one of the following information:
      a time domain position of the second system information;
      whether the second system information is continuously scheduled, periodically scheduled, or scheduled according to a preset rule in time domain; or
      scheduling duration or a scheduling periodicity of the second system information in time domain.

10. The communication method according to claim 7, wherein:
    the first system information is a master information block (MIB), and the second system information is a system information block (SIB1); or
    the first system information is an SIB1, and the second system information is other system information (OSI).

11. The communication method according to claim 7, wherein the determining, by the terminal device, transmission information of fourth system information based on the DCI comprises:
    determining, by the terminal device, the transmission information of the fourth system information based on at least one bit comprised in the DCI.

12. The communication method according to claim 7, wherein:
    the third system information is a master information block (MIB), and the fourth system information is a system information block (SIB1); or
    the third system information is an SIB1, and the fourth system information is other system information (OSI).

13. A communication apparatus, comprising:
    at least one processor; and
    one or more memories coupled to the at least one processor and storing programming instructions for execution by the at least one processor to:

receive N pieces of first information in N separate transmissions, wherein N is an integer greater than 1;

determine second information or transmission information of the second information based on at least a part of the N pieces of the first information, wherein each of the N pieces of the first information comprises M bits, and M is an integer greater than or equal to 1;

receive a first system information;

receive downlink control information (DCI) based on the first system information; and determine transmission information of second system information based on the DCI, wherein the transmission information of the second system information comprises at least one of a quantity of repeated transmissions of the second system information, a quantity of repeated transmissions or continuous scheduling time of scheduling information of the second system information, frequency domain resource information of the second system information, or time domain resource information of the second system information, and wherein at least one of:

the frequency domain resource information comprises bandwidth part (BWP) information, wherein the BWP information indicates a BWP in which the second system information is located; or the time domain resource information indicates at least one of the following information:
a time domain position of the second system information;
whether the second system information is continuously scheduled, periodically scheduled, or scheduled according to a preset rule in time domain; or
scheduling duration or a scheduling periodicity of the second system information in time domain.

14. The communication apparatus according to claim 13, wherein the programming instructions are for execution by the at least one processor to:
determine the second information or the transmission information of the second information based on some or all bits in the received N pieces of the first information.

15. The communication apparatus according to claim 13, wherein the transmission information of the second information comprises at least one of the following information:
a quantity of repeated transmissions of the second information, a quantity of repeated transmissions of scheduling information of the second information, frequency domain resource information of the second information, or time domain resource information of the second information.

16. The communication apparatus according to claim 15, wherein at least one of:
the frequency domain resource information comprises bandwidth part (BWP) information, wherein the BWP information indicates a BWP in which the second information is located; or
the time domain resource information indicates at least one of the following information:
a time domain position of the second information;
whether the second information is continuously scheduled, periodically scheduled, or scheduled according to a preset rule in time domain; or
scheduling duration or a scheduling periodicity of the second information in time domain.

17. The communication apparatus according to claim 14, wherein the programming instructions are for execution by the at least one processor to:
determine a second bit in the received N pieces of the first information based on a first bit in the received N pieces of the first information, wherein the first bit indicates location information of the second bit; and
determine the second information or the transmission information of the second information based on the second bit.

18. The communication apparatus according to claim 13, wherein:
each of the N pieces of the first information is carried in a master information block (MIB), and the second information is a system information block (SIB1); or
each of the N pieces of the first information is carried in an SIB1, and the second information is other system information (OSI).

* * * * *

UNITED STATES PATENT AND TRADEMARK OFFICE
CERTIFICATE OF CORRECTION

Page 1 of 1

PATENT NO. : 12,267,844 B2
APPLICATION NO. : 17/668795
DATED : April 1, 2025
INVENTOR(S) : Bin Xu et al.

It is certified that error appears in the above-identified patent and that said Letters Patent is hereby corrected as shown below:

In the Claims

In Column 26, In Line 13, In Claim 1, delete "Nis" and insert -- N is --.

Signed and Sealed this
Twenty-second Day of July, 2025

Coke Morgan Stewart
*Acting Director of the United States Patent and Trademark Office*